United States Patent [19]

Craig et al.

[11] Patent Number: 5,396,069

[45] Date of Patent: Mar. 7, 1995

[54] PORTABLE MONOCULAR NIGHT VISION APPARATUS

[75] Inventors: Jeffrey L. Craig, Beavercreek; Charles Bates, Jr.; Harry L. Task, both of Dayton; Sheldon E. Unger, Englewood, all of Ohio

[73] Assignee: The United States of America as represented by the Secretary of the Air Force, Washington, D.C.

[21] Appl. No.: 85,388

[22] Filed: Jul. 1, 1993

[51] Int. Cl.⁶ .................................. H01J 31/50
[52] U.S. Cl. .................... 250/330; 250/214 VT; 372/38
[58] Field of Search ............ 250/504 H, 330, 214 VT; 372/38

[56] References Cited

U.S. PATENT DOCUMENTS

| | | | |
|---|---|---|---|
| H322 | 8/1987 | Simons | 372/38 |
| 4,463,252 | 7/1984 | Brennan et al. | 250/214 VT |
| 4,504,951 | 3/1985 | McMahan et al. | 372/38 |
| 4,642,452 | 2/1987 | Loy | 250/214 VT |
| 4,658,139 | 4/1987 | Brennan et al. | 250/330 |
| 4,775,217 | 10/1988 | Ellis | 350/538 |
| 4,820,031 | 4/1989 | Kastendieck et al. | 350/538 |
| 4,948,210 | 8/1990 | Simms | 350/1.4 |
| 4,990,780 | 2/1991 | Lee et al. | 250/343 |
| 4,993,161 | 2/1991 | Borkovitz | 356/250 |
| 5,042,048 | 8/1991 | Meyer | 250/504 H |
| 5,229,598 | 7/1993 | Filipovich | 250/214 VT |
| 5,272,716 | 12/1993 | Soltz et al. | 372/38 |

*Primary Examiner*—Carolyn E. Fields
*Attorney, Agent, or Firm*—Gerald B. Hollins; Thomas L. Kundert

[57] ABSTRACT

A monocular night vision apparatus employing an infrared energy spectrum source of illumination and a camera lens and night vision image intensifier combined receiver apparatus into a small hand-held portable package that is both low in cost and reliable in nature is described. The night vision transmitter apparatus includes a laser diode energy source that is coupled to an aperture controlled and focus controlled optical system and driven by an electronic closed-loop feedback energization circuit which employs self-contained battery sources of energy. Multiple operating modes and operating intensities of the light source are provided through a plurality of signal inputs to the closed feedback loop of the laser diode energy source. Disturbance of the closed feedback loop by reflected energy within the optical transmitter apparatus is precluded by the use of feedback prevention optical alignment in the transmitter's optical system.

1 Claim, 4 Drawing Sheets

PORTABLE MONOCULAR NIGHT VISION APPARATUS

RIGHTS OF THE GOVERNMENT

The invention described herein may be manufactured and used by or for the Government of the United States for all governmental purposes without the payment of any royalty.

BACKGROUND OF THE INVENTION

This invention relates to the field of portable night vision apparatus of the hand-held and self-illuminating type.

Infrared spectrum responsive night vision apparatus has become a necessary part of modern military equipment. The ability to see objects that are in total darkness but illuminated with infrared energy has been demonstrated in the recent Desert Shield and Desert Storm military endeavors and elsewhere to now be a major tactical advantage. Indeed, the ability to see an opponent and his military hardware under totally invisible conditions to the unaided eye has now removed the advantage of nighttime and smoke screen obscured military activity.

Much of the presently used infrared military equipment is intended for operation in an aircraft, a battle tank, a motor vehicle or in a fixed location environment. The now-current third-generation night vision apparatus, however, has energy requirements, physical dimensions, and weight characteristics which readily enable successful portable use of such equipment. A small hand-held and truly portable night vision apparatus, especially an apparatus of simplicity and low cost, has, however, not been widely available heretofore.

The patent art includes several examples of night vision apparatus or infrared energy responsive apparatus that is of general background interest with respect to the present invention. Included in this art is the patent of T. M. Brennan et al, U.S. Pat. No. 4,463,252, relating to a battery-operated night vision goggle system of the two-eye and ambient vision excluding type.

Also included in this art is the night vision viewing system of S. M. Ellis as disclosed in U.S. Pat. No. 4,775,217, a system of the helmet mounted two-eye type.

Additionally included in this art is the infrared zoom illuminator of R. A. Simms as is disclosed in U.S. Pat. No. 4,948,210. The Simms illuminator contemplates the use of an infrared laser light source and an optical lens system by which the emitted infrared energy may be disposed in the form of a floodlight or a spotlight.

Additionally included in this art is the semi-active night viewing system of F. R. Loy as disclosed in U.S. Pat. No. 4,642,452, an apparatus for television camera usage wherein a flash of laser diode sourced light is used for identification of a specific target.

SUMMARY OF THE INVENTION

The present invention provides a portable hand-held monocular night vision device. In the device, illumination provided by a solid state laser is boresighted with the field of view of a monocular lens and image intensifier night vision apparatus. The night vision device of the invention is small and portable and energized by self-contained batteries. The device also provides variable focus ability for both the transmitted infrared illumination energy and the received energy from the viewed object. Additional flexibility in the form of variable operating intensity for the illumination source and manually electable or automatically recurring pulse operation are provided. The invention affords a low-cost approach to night vision through use of a readily available photographic camera lens assembly in the received light channel.

It is therefore an object of the invention to provide a fully portable and self-contained monocular night viewing apparatus.

It is another object of the invention to provide a laser diode energized night viewing apparatus in which an illuminating source is boresighted with a monocular image intensifier reception channel.

It is another object of the invention to provide a night vision monocular apparatus having both a continuous full-time and a pulsed/recurring pulses mode of operation, the latter being especially useful for energy consumption minimization and for military stealth uses.

It is another object of the invention to provide a night vision apparatus in which the illuminating energy source or transmitting portion of the apparatus is provided with a stable and feedback controlled output energy level capability.

It is another object of the invention to provide a night vision apparatus in which the illumination source is provided with this feedback control stability while also being immune to feedback disturbing optical internal reflection effects.

It is another object of the invention to provide a night vision monocular apparatus in which the illumination source and the optical receiver are commonly mounted for hand-held usage.

Additional objects and features of the invention will be understood from the following description and claims and the accompanying drawings.

These and other objects of the invention are achieved by portable hand-held night vision apparatus comprising the combination of hand-disposable monocular optical means for generating an optically magnified infrared spectrum determined image of a distant object at one eye of a human user; the monocular optical means including optical lens assembly input means and infrared spectrum responsive image intensifier means for generating an electronically enhanced and enlarged infrared spectrum based image of the distant object; and infrared energy sourcing illuminator means physically supported on the hand-disposable monocular optical means for illuminating a limited area attending the distant object with predetermined spectrum infrared energy; the infrared energy sourcing illuminator means illuminated limited area being boresighted with a viewing field of the monocular optical means.

DETAILED DESCRIPTION

Figure 1:
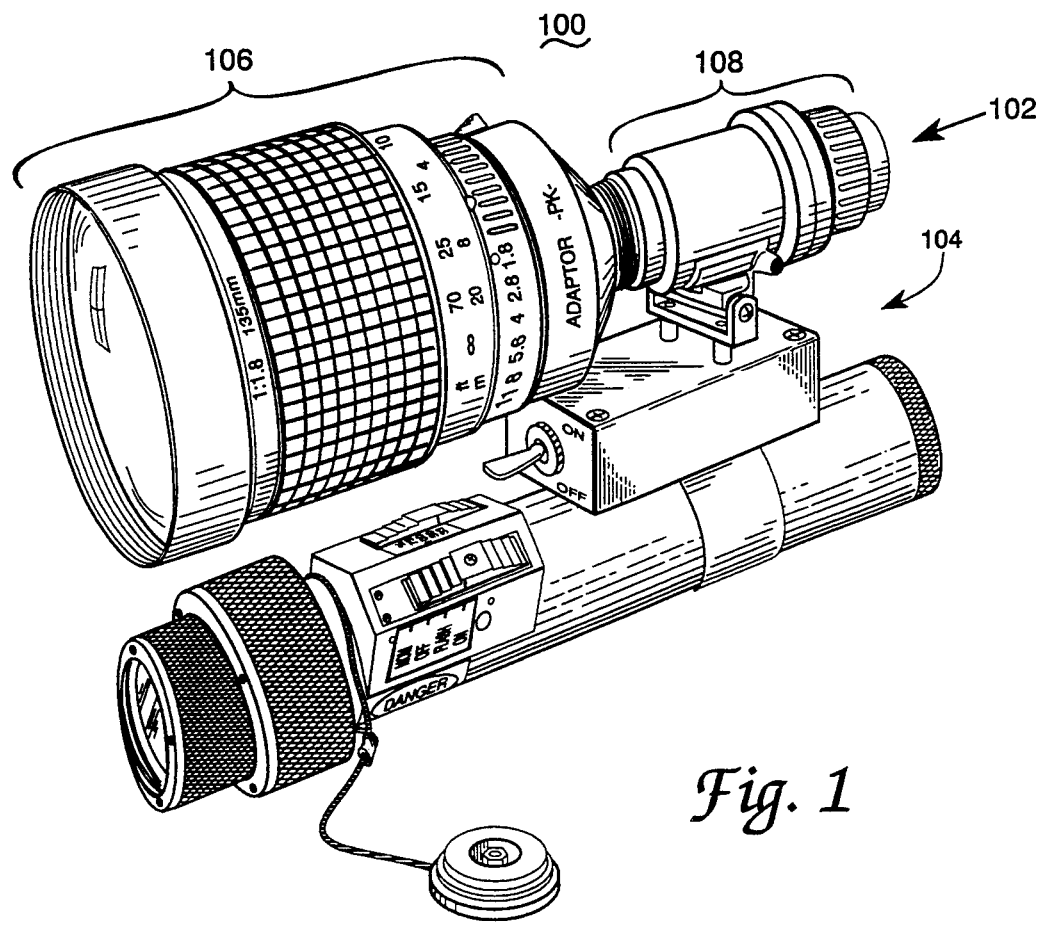
FIG. 1 shows an overall perspective view of a night vision apparatus according to the invention.

FIG. 1 in the drawings shows an overall perspective view of a monocular night vision apparatus in accordance with the present invention. The FIG. 1 monocular night viewing apparatus 100 is comprised of a source of infrared illumination or an infrared transmitter apparatus 104 and a light receptor and image generating receiver apparatus 102; this assembly may be hand-held and used with either eye of a using person.

A notable feature of the FIG. 1 night viewing apparatus is that the reflected light receiving portion 102 of the apparatus is comprised of two separate parts, each of which is readily available in the existing high-tech marketplace. The receiver 102 is comprised of a lens assembly 106 and an image intensifier inclusive low available light image forming apparatus 108 that is optically coupled to the camera lens assembly 106. The use of existing and readily available component parts has the advantage of making the FIG. 1 night vision apparatus to be relatively low in cost and thereby supports the widest possible availability of such apparatus to military persons and to other users.

Although a number of commercially available photographic camera lens assemblies may be used at 106 in the FIG. 1 apparatus, it has been found that the f/1.8 variable focus multiple lens assembly of 135 millimeters focal length that is available as a type "SMC" lens from the Japanese Pentax Corporation is especially well suited for use in the FIG. 1 apparatus. This Pentax lens is sold by the manufacturer for use with 35 millimeter still image photographic cameras.

In a similar manner, the eyepiece and image intensifier portion 108 of the FIG. 1 apparatus may be comprised of a single eyepiece portion of an Aviator Night Vision Imaging System (ANVIS) of the type manufactured by Varo Electron Devices of Garland, Tex. 75046-9014 USA. Similar apparatus is also manufactured by Nite Optics Inc. of Wilkes-Barre, Pa. 18703-2426 and by ITT Defense and Electronics, Electro-Optical Products Division of Roanoke, Va. The ANVIS system eyepiece assembly, as is described in the Varo Inc. 1989 data sheet designated as ED 021G89, is found to be suitable for use with the FIG. 1 apparatus. The ANVIS eyepiece operates from a 3.0 volt DC source and provides viewing distances of 11 inches to infinity with brightness gain in the range of 1850 to 2000 times. Additional details concerning this model 2000 eyepiece assembly are available from the above identified data sheet. It is notable that the ANVIS system is subject to export license controls by the U.S. Department of State as prescribed in the International Traffic-in-Arms Regulations (ITAR) of Title 22, Code of Federal Regulation, Parts 121–128, this is also noted on the above identified data sheet.

Figure 2:
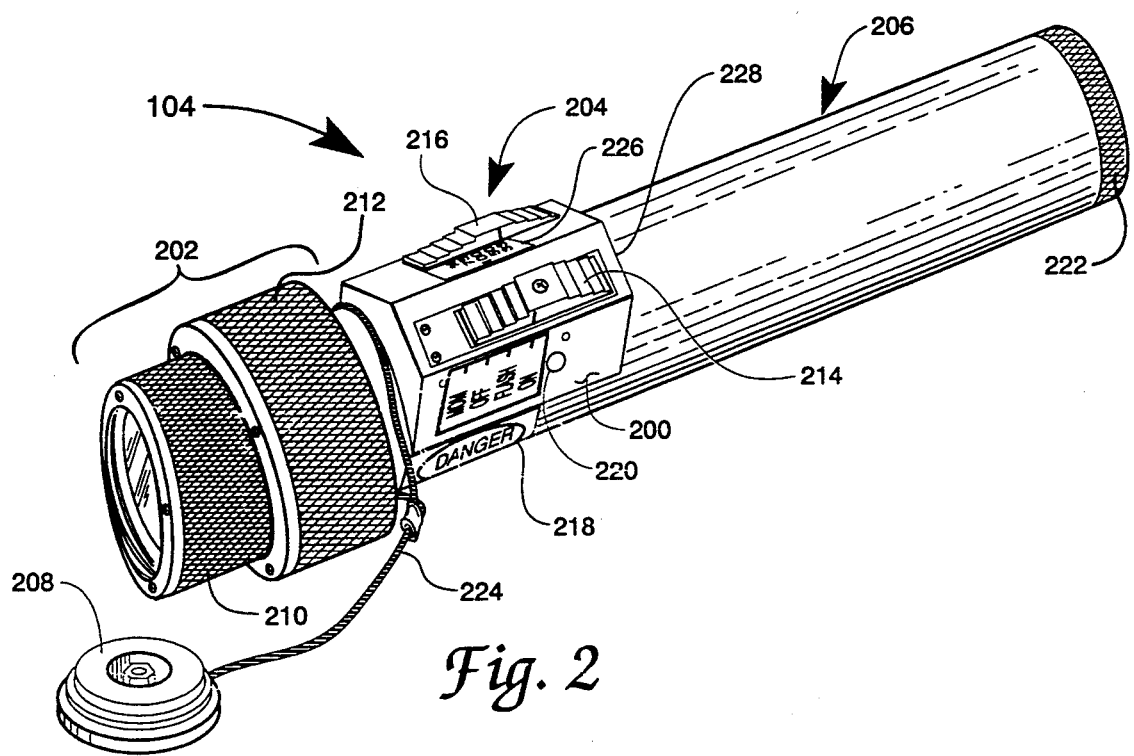
FIG. 2 shows additional details of the illumination source or transmitter portion of the FIG. 1 apparatus.

FIG. 2 in the drawings shows a more detailed perspective external view of the infrared transmitter apparatus 104 in FIG. 1. In FIG. 2 it may be observed that the transmitter apparatus 104 includes an optical section 202, a user control assembly 204 and a battery container portion 206. The optical section 202 of the FIG. 2 transmitter 104 is provided with operator controls in the form of a rotatable focus adjustment 212, a rotatable iris adjustment 210 and a lens cap member 208 which is attached to the body of the transmitter apparatus 104 by way of a tether cable 224.

The FIG. 2 user control assembly 204 is shown to include two user operable selection switch members 214 and 216 which, together with the adjacent label indications, allow user control over several variations in the operating protocol of the FIG. 2 transmitter. The mode switch 214, for example, allows user selection of a momentary flash mode of operation for the transmitter apparatus. The switch 214 is spring-loaded to preclude its remaining in this momentary operating mode position. The switch 214 can also be placed in an infrared energy-terminating off position, a repeating flash selecting position, or a continuously on selecting position, all of which are indicated on the switch label 200.

The intensity control switch 216 in FIG. 2 is provided with a label 226 which indicates four different levels of operating intensity for the switch 216. As indicated on the label 226, the FIG. 2 transmitter includes provisions for infrared energy output intensity that is 100%, 75%, 50%, or 33% of a maximum intensity value. Each of the switches 214, and 216 is in fact arranged to be a magnetically operable combination of electrical switches, as is shown electrically in FIGS. 4 and 5 hereof, in order that the FIG. 2 transmitter apparatus be of a rugged and waterproof nature.

The battery container portion 206 of the FIG. 2 transmitter includes a rearwardly disposed cylindrical space for a pair of high energy-density electrical battery cells, preferably of the lithium battery type, in a manner resembling the ordinary hand-held flashlight. A threaded cap member 222 is provided for the battery insertion end of this battery container portion. The battery cap member 222 is preferably provided with a battery engaging tension spring and also with a resilient O-ring seal - - - in order to maintain the waterproof and military hardened nature of the FIG. 2 transmitter.

At 218 on the FIG. 2 transmitter apparatus is disposed a warning label which addresses the question of eye safety attending this or any laser-based optical apparatus. The optical energy output of the FIG. 2 transmitter has been demonstrated to be of a sufficient level to merit a label of this type.

A combination safety release for the switch 214 and laser-in-operation optical pilot signal button is indicated at 220 in FIG. 2. Movement of the switch 214 from the off position is arranged to require a simultaneous depression of this button 220. During operation of the FIG. 2 transmitter, the optical signal function of the button 220 is arranged to operate whenever the laser energy source within the FIG. 2 apparatus is energized - - - as is disclosed in greater detail in connection with FIG. 5 below.

Figure 3:
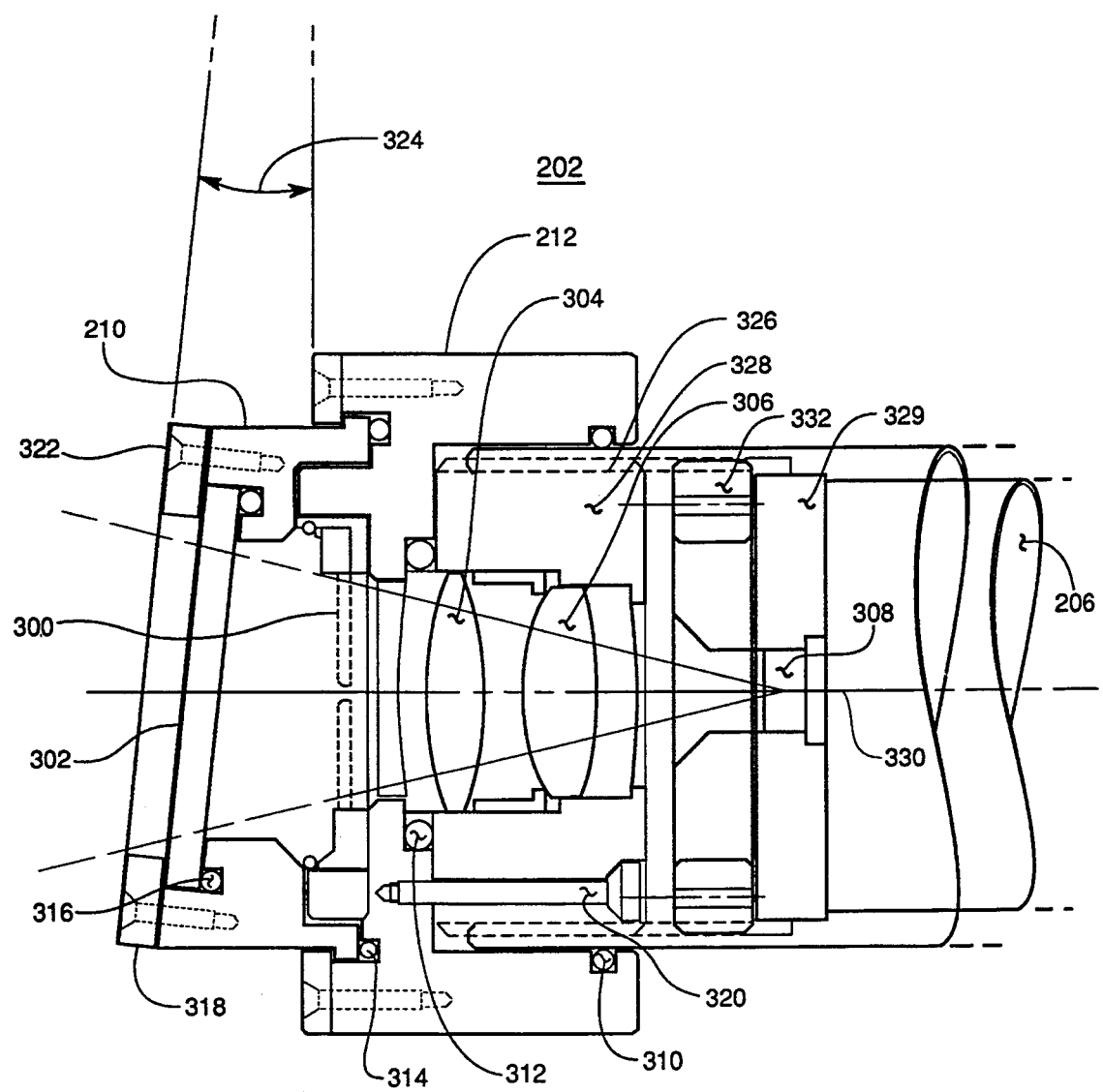
FIG. 3 shows internal details of the FIG. 2 illumination source.

FIG. 3 in the drawings shows internal details of the optical section 202 of the FIG. 2 apparatus. In the FIG. 2 drawing the battery container portion 206, the rotatable iris adjustment 210, and the rotatable focus adjustment 212 which were first described in FIG. 2 are repeated using their FIG. 2 related numbers in the 200 series. Also shown in FIG. 3 are additional details of the optical section 202, details which include the mechanical shutter iris assembly 300, the mechanical protection window 302, and the optical lenses 304 and 306.

Also shown in FIG. 3 are the laser energy light source and its mounting assembly, 308, a series of resilient-material O-rings 310, 312, 314, and 316 which serve as both friction adding members for the movable parts of the FIG. 2 and FIG. 3 apparatus and also as resilient seals against the entrance of dirt and moisture into the transmitter apparatus. These O-rings may be composed of buna or neoprene rubber as is known in the apparatus sealing art. A mechanical bezel member is shown at 318 in FIG. 3 and serves to retain the protection window 302 in position and also as protection against physical abuse of this window. The bezel 318 as well as other parts of the FIG. 3 apparatus are retained in position by a series of threaded machine screws which are shown typically at 320 and 322.

Each of the FIG. 3 battery-container portion 206, the lens carrier 328, and also the retaining ring 332 for the laser source carrier assembly 329 are provided with mating threads in order that the optical distances attending these elements be precisely determinable and stable in nature. The threads of the battery container portion 206 are indicated at 326. During assembly of the FIG. 3 apparatus it is contemplated that the laser source carrier assembly 329 is first disposed in the battery container portion 206 and seated against an appropriate stop surface. The lens carrier assembly 328 is then entered along these same threads and allowed to remain at a rotatable and operator selected position which determines the distance between the lens 306 and the laser source 308, and thereby the output optical energy configuration for the FIG. 2 and FIG. 3 transmitter apparatus.

At 324 in FIG. 3 is indicated an angular measurement by which the mechanical protection window 302 is displaced from an orthogonal relationship with the central axis 330 of the FIG. 3 assembly. This angular displacement of the window 302 serves to prevent reflection of laser sourced energy from the interior surface of the window 302 back through the lenses 304 and 306 and into the laser assembly, where such energy would undesirably disturb operation of the closed-loop laser intensity determining system that is described below in connection with FIG. 4. By way of this offset angle indicated at 324, reflections from the interior surface of the mechanical protection window 302 are directed away from the central axis 330 and the laser assembly 308.

Figure 4:
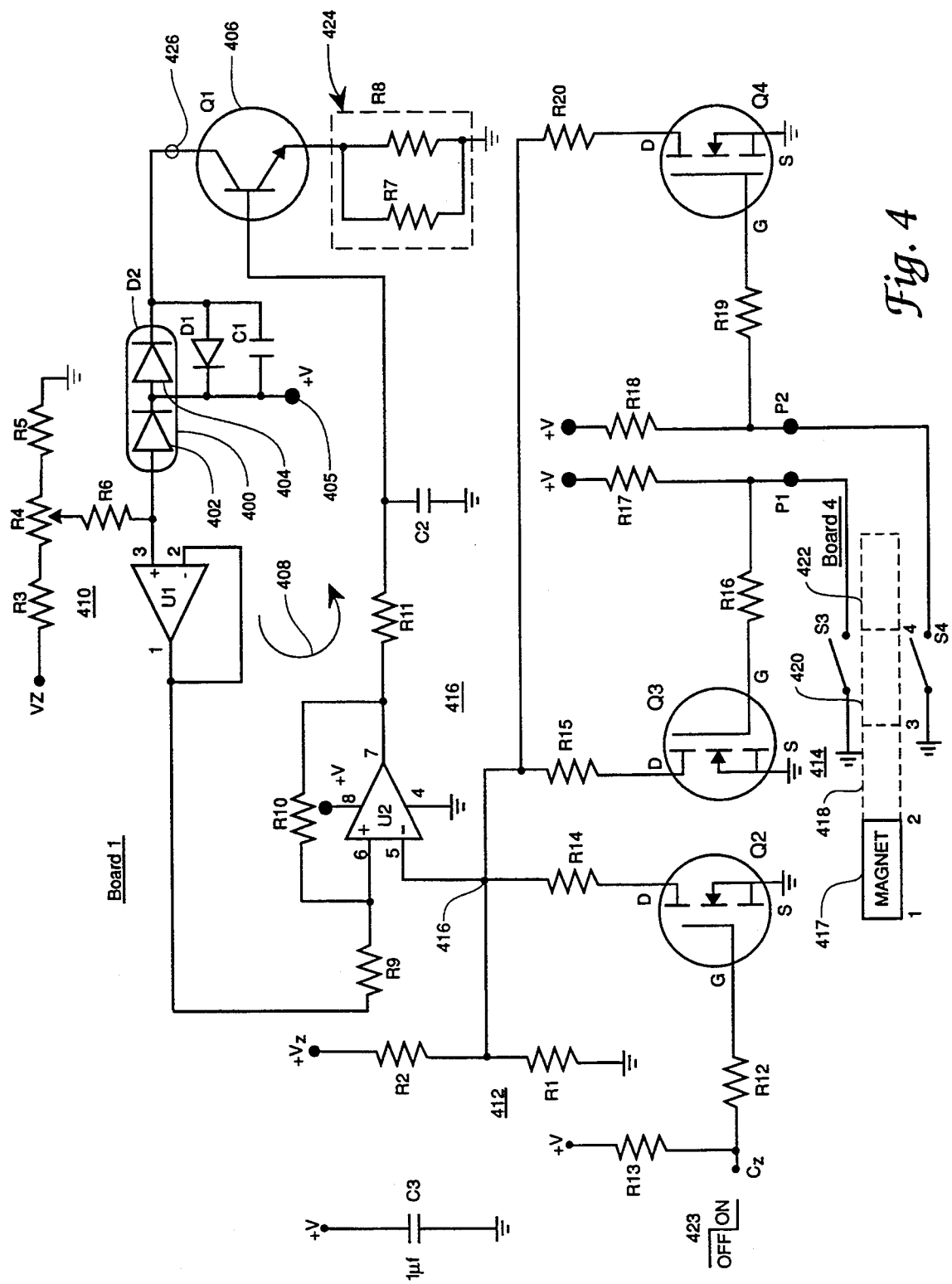
FIG. 4 shows a partial electrical schematic diagram of the FIG. 2 and FIG. 3 illumination source.
Figure 5:
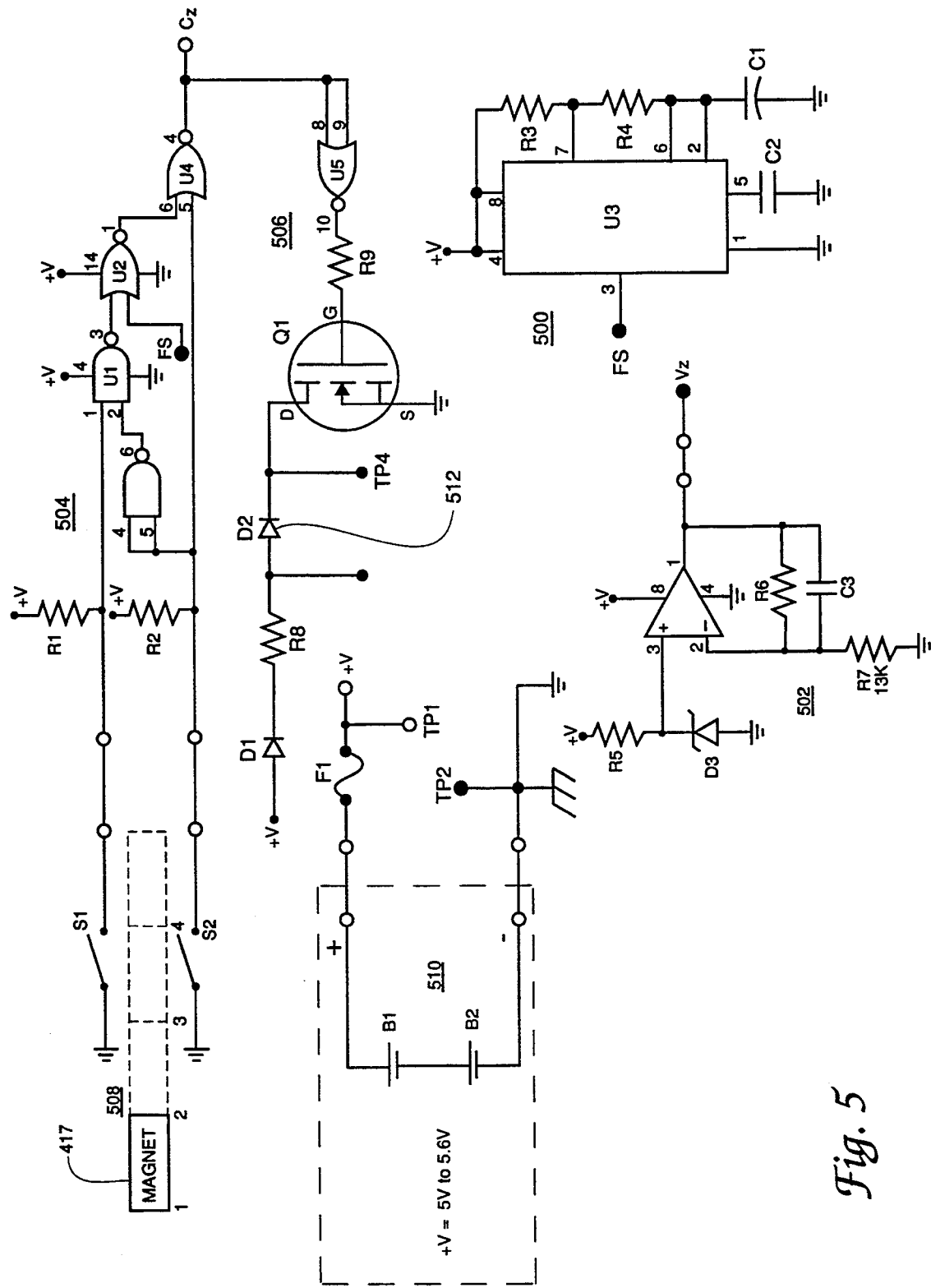
FIG. 5 shows additional electronic circuitry in the FIG. 2 and FIG. 3 illumination source.

FIGS. 4 and 5 in the drawings each show parts of an electrical schematic diagram for the electronic circuitry attending the laser light source in FIG. 3. In the FIG. 4 drawing the laser energy source assembly is indicated at 400 and is shown to include both a laser diode element 404 and a light responsive photodiode member 402. Additionally shown in FIG. 4 is the series pass control transistor 406 which determines the operating intensity of the laser diode 404, together with the electrical components which comprise a closed-loop connection between the sensing diode 402 and the series pass transistor 406, this loop being indicated at 408 in FIG. 4.

The FIG. 4 drawing components also include the adjustable resistor network 410, used to adjust the operating point of the laser diode 404, and the transistor switchable resistor network, generally indicated at 412, by which the user's input from the switch 216 in FIG. 2 is communicated to the circuitry attending the laser diode 404. The switch function user inputs are applied to the operational amplifier circuit node 416 in order to control the operating point of the laser closed-loop circuitry 408.

At 414 in FIG. 4 are shown the two magnet controlled electrical switches which comprise the intensity control function at 216 in FIG. 2; the four positions of this intensity control are indicated at 417, 418, 420, and 422 in FIG. 4. The switch closing to intensity percent relationship is indicated in Table I which is listed below.

TABLE I

| Magnet Position | Intensity Selection | | | | |
|---|---|---|---|---|---|
| | Switches | | TTL Condition | | |
| | S3 | S4 | P1 | P2 | Intensity |
| 1 | Open | Open | 1 | 1 | 25 |
| 2 | Open | Closed | 1 | 0 | 50 |
| 3 | Closed | Closed | 0 | 0 | 100 |
| 4 | Closed | Open | 0 | 1 | 75 |

At 424 in FIG. 4 is shown the pair of parallel connected resistors used to determine the operating point of the NPN series pass transistor 406 which controls the laser diode 404. The current flow in this series past transistor, the current flowing in the path 426, is in the magnitude of 300 to 400 milliamperes. This operating current for the laser diode 404 is received at the circuit node 405 from the battery and other circuit components indicated in FIG. 5 of the drawings. The functional operation of the FIG. 4 and FIG. 5 circuitry will be described below subsequent to the following brief description of the FIG. 5 circuitry. The components of the FIG. 4 and FIG. 5 circuitry are identified with the R1, R2, D3, Q1 and so on, alphanumeric legends commonly used in the electronic art with the nature and electrical size of these components being indicated in Tables III, IV, and V which follow below.

TABLE III

| D2 Laser Diode 400 | Board 1 and Board 2 Components | | | | | | | |
|---|---|---|---|---|---|---|---|---|
| | R6* | R2 | R3 | R4 | R5 | R6 | R7 & R8 | Q1 |
| 50 mW 202-3 | 22K | 680 | 180 | 1K | 680 | 5.1K | 15 ½W | 2 SC 1826 |
| 100 mW 301 | 22K | 680 | 180 | 1K | 200 | 1K | 5 1W | 2 SC 1826 |
| 200 mW 302 | 24K | 1.3K | 0 | 1K | 200 | 1K | 4 1W | 2 SC 1826 |

*Board 1 component, all other components are located on Board II.

TABLE IV

| FIG. 4 Board 1 and Board 4 Components | |
|---|---|
| C1 | 1 μf, 6v |
| C2 | 100 μf, 6v |
| C3 | 1 μf, 6v |
| D1 | 1sc1555 |
| D2 | Laser Diode assembly, see Table III |
| Q1 | 2SC1826 |
| Q2 | VN10KM |
| Q3 | VN10KM |
| Q4 | VN10KM |
| R1 | 6.8K |
| R2 | See Table III |
| R3 | See Table III |
| R4 | See Table III |
| R5 | See Table III |
| R6 | See Table III |
| R7 | See Table III |
| R8 | See Table III |
| R9 | 10K |
| R10 | 100K |
| R11 | 100K |
| R12 | 1K |
| R13 | 10K |
| R14 | 680Ω |
| R15 | 4.3K–6.8K |
| R16 | 1K |

TABLE IV-continued

| FIG, 4 Board 1 and Board 4 Components | |
| --- | --- |
| $R_{17}$ | 22K |
| $R_{18}$ | 22K |
| $R_{19}$ | 1K |
| $R_{20}$ | 10K-13K |
| $S_3$ | Magnetically Actuated Switch |
| $S_4$ | Magnetically Actuated Switch |
| $U_1$ | ½ LM 358D |
| $U_2$ | ½ LM 358D | all resistors ⅛ watt, except as noted.

TABLE V

| FIG. 5 Board 2 and Board 3 Components | |
| --- | --- |
| $A_1$ | LM358D |
| $B_1$ | 3v Lithium, e.g., Power Conversion Inc., G 20/11 |
| $B_2$ | 3v Lithium, e.g., Power Conversion Inc., G 20/11 |
| $C_1$ | 10 μf, 6v |
| $C_2$ | .01 μf |
| $C_3$ | 150 pf |
| $D_1$ | 1N914 |
| $D_2$ | LED, HLMP 6505 |
| $D_3$ | LM385, 1.2v |
| $F_1$ | ¾ Amp |
| $Q_1$ | VN10KM |
| $R_1$ | 22K |
| $R_2$ | 22K |
| $R_3$ | 10K |
| $R_4$ | 82K |
| $R_5$ | 10K |
| $R_6$ | 24K |
| $R_7$ | 13K |
| $R_8$ | 180Ω |
| $R_9$ | 1K |
| $S_1$ | Magnetically Actuated Switch |
| $S_2$ | Magnetically Actuated Switch |

FIG. 5 in the drawings shows several laser light source related miscellaneous circuits embodied on printed circuit board 2 and 3 of the FIG. 2 transmitter apparatus, circuits which are used in conjunction with the board 1 and board 4 circuits of FIG. 4 in operating the laser diode infrared energy source 404. The circuitry at 504 in FIG. 5 is a collection of NAND and NOR logic circuits used to determine the $C_z$ electrical signal that is applied according to the waveform 423 to the input gate of transistor Q2 in FIG. 4 as a mode selection signal. The $C_z$ signal when in its lowest state, as indicated at 423, enables energization of the laser diode 404. The $C_z$ signal is determined from the 4 possible combinations of the mode selection switches S1 and S2 at 508 in FIG. 5 in accordance with the data shown in Table 2.

TABLE II

| | | Mode Selection | | | |
| --- | --- | --- | --- | --- | --- |
| Magnet | Switches | TTL Condition | | Selected | |
| Position | S1 | S2 | S1 | S2 | Mode | $C_z$ |
| 1 | Open | Open | 1 | 1 | On | Low |
| 2 | Open | Closed | 1 | 0 | Flashing | Periodic Low |
| 3 | Closed | Closed | 0 | 0 | Off | High |
| 4 | Closed | Open | 0 | 1 | Momentary On | Pulse Low |

The circuitry at 506 accomplishes energization of the light emitting diode (LED) D2 at 512 in FIG. 5 each time the laser diode 404 is energized. The light emitting diode 512 provides pilot illumination for the button 220 described in FIG. 2, that is, the indication of laser energy emission observed on the button 220. The test points on anode and cathode sides of the LED 512 provide electrical access to this diode for its energization and physical placement during assembly of the FIG. 2 apparatus in order to optimize optical coupling between the LED output and the translucent plastic of the button 220.

The energy source for the entire FIG. 2 transmitter apparatus is indicated at 510 in FIG. 5, the two illustrated battery cells being preferably of the 3-volt lithium type. Current delivered by this battery is limited by the ¾ ampere fuse indicated at F1. Following the fuse F1 the battery potential is applied to the distribution node indicated as +V which appears in numerous locations throughout the FIG. 4 and 5 circuit schematics.

The integrated circuit U3 at 500 in FIG. 5 provides periodic timing pulses for the pulsed mode of operation of the FIG. 2 apparatus. The FS output signal of this timer is applied to the second-last NOR gate in the logic at 504 in FIG. 5. The operational amplifier and attending circuitry at 502 in FIG. 5 provides a constant reference voltage as determined by the Zener diode D3 for use in the operating point determination circuitry at 410 in FIG. 4 as well as for use in the voltage divider determining operating potentials at the node 416 in FIG. 4.

During operation of the FIG. 4 and FIG. 5 circuitry whenever the $C_z$ signal at 423 is in the low condition, the circuit node 416 is driven to a voltage determined by the selectable resistor network 412 and results in a turn-on of the series pass control transistor Q1 and energization of the laser diode 404. The magnitude of the current flow in the laser diode 404 is determined by a setting of the resistor network at 410 and is also determined by the operating potential of the node 416 as a result of the circuitry at 412. Once the laser diode 404 is energized, the feedback loop 408 is in control of the emission from the laser diode 404 with the circuits at 412 and 410 each providing modification or inputs to this feedback loop 408 and thereby modification or change of the laser diode's output energy.

It is noted that the laser diode 404 operates with a potential drop of about 2.2 volts and a current of 300 to 400 milliamps and that the remaining portion of the 5.6 to 6.0 volts developed by the battery at 510 appears across the control transistor 406 and the resistor pair at 424. By way of this relatively large voltage across these laser control circuit elements, and by way of the battery-independent and fixed voltage reference $V_z$ at the two input ports of the feedback loop 408, the light output of the laser 404 is made to be largely independent of decreasing output voltage from the batteries B1 and B2 at 510. The closed-loop regulated nature or constant output energy of the optical output from the laser diode 404 is therefore maintained for the longest possible period in the presence of battery depletion in the described apparatus.

The electronic circuit components of FIG. 4 and FIG. 5 are preferably disposed on two circular configured printed circuit boards which are located within the battery container portion 206 of the apparatus in FIG. 2 and are preferably disposed immediately below or on the battery side of the rotatable focus adjustment 212. The board 3 and board 4 electrical switches are preferably disposed on a rectangular shaped small printed circuit board located within the housing 228 surrounding the switches 214 and 216 in FIG. 2.

As is indicated in Tables 3 and 4 herein, the laser diode 404 is preferably selected according to optical energy output requirements as determined by the viewing distances and viewing field area of the disclosed apparatus. A number of sources of such diodes exist in the electronic marketplace. The diodes supplied by Sony Corporation at 23430 Hawthorne Blvd., Torrance Calif. 90505 have been found suitable for this usage with three of such Sony Corporation diodes being identified by the part numbers listed in Table 3 herein. The indicated diodes provide infrared output energy with a predominant peak at the wavelength of 830 nanometers plus or minus 10 nanometers.

For demonstration or other eye safe uses of the invention, the laser diode 404 may be replaced with a common light emitting diode. In this use, the feedback loop 408 may be disabled and biased to provide a predetermined output.

As a careful examination of the electrical circuitry in FIG. 4 and FIG. 5 will indicate, a placement of the mode selection control 214 in the indicated off position accomplishes a termination of optical energy emission from the laser diode 404 by way of altering the operating conditions within the feedback loop 408. In this alteration, the series pass transistor 406 is placed in the non current conducting condition. It is significant to note, however, that this optical energy "off" condition does not disconnect all of the FIG. 4 and 5 circuitry from the electrical battery 510; that is, the logic and amplifier circuits in FIG. 4 and 5 remain energized and tend to discharge the battery 510 even in the off mode of operation of the FIG. 2 transmitter. To preclude battery discharge during such intervals of non-use an additional electrical switch may be provided in one of the battery leads, or as has been found convenient, a partial loosening of the battery container cap at 222 accomplished in order to interrupt the battery electrical circuit.

The FIG. 2 to FIG. 5 optical energy transmitter apparatus therefore, when used in conjunction with the above described receiver apparatus, and fabricated using existing camera lens and night vision image intensifier apparatus, provides a low cost and convenient night vision monocular apparatus which may be more widely disposed among military personnel and other night operations persons. The relatively light weight, small size, portability, rugged physical characteristics and reliable operation obtainable from the described apparatus further lends to its usefulness in a wide variety of night vision operations.

While the apparatus and method herein described constitute a preferred embodiment of the invention, it is to be understood that the invention is not limited to this precise form of apparatus or method and that changes may be made therein without departing from the scope of the invention which is defined in the appended claims.

We claim:

1. Portable, hand-held monocular night vision apparatus comprising the combination of:

an infrared spectrum responsive optical energy receiver apparatus including a variable focus photographic camera lens assembly optically coupled with a night vision image intensifier eyepiece assembly;

an infrared spectrum emitting selectable operating intensity, optical energy source apparatus disposed in physical connection with said receiver apparatus and boresighted therewith, said optical energy source apparatus further including;

a controllable aperture, controllable focus, multiple lens optical system enclosed at its output aperture by a protective window member and optically energized at a central optical axis focal point thereof by a laser semiconductor diode assembly;

said laser semiconductor diode assembly including a energy emitting laser diode member optically coupled with an input port of an optical energy responsive photodiode transducer member;

a closed-loop electronic circuit feedback apparatus including a series pass junction transistor connected in electrical series with said laser diode member and controlled in operating point by closed-loop electrical signals originating in an optical energy responsive electrical output signal of said photodiode transducer member;

said feedback apparatus further including adjustment means (410, U1) for determining an initial operating point of said laser diode member and control signal input means (416, U2) responsive to an analog intensity selection signal and to a digital on-off control signal for determining both an operating intensity level and on-off operation of said laser diode member;

analog intensity selection signal generating means including a first pair of operator selectively closeable electrical switch members and electronic decoding logic circuitry responsive thereto for generating said analog intensity selection signal;

digital on-off control signal generating means including a second pair of operator selectively closeable electrical switch members and electronic decoding logic circuitry responsive thereto and an electronic timing circuit for generating said digital on-off control signal;

said on-off control signal including a selectable one of a momentary on, a continuously on, a periodically-on and controlled by said timing circuit, and a continuously off laser operating mode options;

electrical energy sourcing means including an electrical battery and a regulator circuit for energizing said laser diode member and said electronic circuitry with electrical energy of a first operating potential and for energizing said feedback apparatus adjustment means and said feedback apparatus control signal input means with a constant voltage regulated second operating potential;

indicator means responsive to a digital control signal from said digital on-off control signal generating means for indicating present instant energizing of said laser diode member; and angularly disposed mounting means for said optical system protective window member located at an infrared energy output port of said source apparatus for displacing a protective window interior surface originating reflected portion of said laser diode output energy away from said central optical axis of said multiple lens optical system and said photodiode transducer member input port of said closed loop electronic circuit feedback apparatus.

* * * * *